(12) United States Patent
Bodum

(10) Patent No.: US 9,314,122 B2
(45) Date of Patent: Apr. 19, 2016

(54) BOWL

(75) Inventor: Jorgen Bodum, Meggen (CH)

(73) Assignee: PI-DESIGN AG, Triengen (CH)

( * ) Notice: Subject to any disclaimer, the term of this patent is extended or adjusted under 35 U.S.C. 154(b) by 0 days.

(21) Appl. No.: 13/885,933

(22) PCT Filed: Mar. 9, 2011

(86) PCT No.: PCT/CH2011/000045
§ 371 (c)(1),
(2), (4) Date: May 16, 2013

(87) PCT Pub. No.: WO2012/009819
PCT Pub. Date: Jan. 26, 2012

(65) Prior Publication Data
US 2013/0228582 A1    Sep. 5, 2013

(30) Foreign Application Priority Data

Nov. 19, 2010  (CH) ...................................... 1943/10

(51) Int. Cl.
| | |
|---|---|
| *A47G 21/00* | (2006.01) |
| *A47G 23/00* | (2006.01) |
| *A47G 19/14* | (2006.01) |
| *A47J 36/06* | (2006.01) |
| *A47J 36/14* | (2006.01) |
| *A47J 43/07* | (2006.01) |
| *A47J 45/06* | (2006.01) |

(52) U.S. Cl.
CPC ................ *A47G 23/00* (2013.01); *A47G 19/14* (2013.01); *A47J 36/06* (2013.01); *A47J 36/14* (2013.01); *A47J 43/0727* (2013.01); *A47J 45/061* (2013.01)

(58) Field of Classification Search
CPC ........... A47G 23/00; A47G 2019/2294; A01K 5/0114; A47J 43/0727; A47J 36/14; A47J 45/061
USPC .......................... 220/574, 606, 608, 631, 672
See application file for complete search history.

(56) References Cited

U.S. PATENT DOCUMENTS

| | | | |
|---|---|---|---|
| 1,394,540 | A | 10/1921 | Diack |
| 2,121,165 | A | 6/1938 | Slobodkin |

(Continued)

FOREIGN PATENT DOCUMENTS

| | | |
|---|---|---|
| CN | 200970093 Y | 11/2007 |
| CN | 201577943 U | 9/2010 |

(Continued)

OTHER PUBLICATIONS

International Preliminary Report on Patentability and Written Opinion dated May 30, 2013 issued in International Patent Application No. PCT/CH2011/000045.

(Continued)

*Primary Examiner* — Anthony Stashick
*Assistant Examiner* — James M Van Buskirk
(74) *Attorney, Agent, or Firm* — Sughrue Mion, PLLC

(57) ABSTRACT

The invention relates to a bowl for mixing food. At least one group of at least three knobs (12; 12'; 12") is attached to the outside of the base (10) of said bowl. All the knobs of a group protrude outwards to a common plane so that the bowl can be placed onto an even surface (70) in an orientation that is inclined with respect to the direction of gravity in such a manner that said bowl lies on the even surface (70) with all the knobs (12; 12'; 12") of said group.

11 Claims, 6 Drawing Sheets

(56) References Cited

U.S. PATENT DOCUMENTS

| | | |
|---|---|---|
| 4,175,670 A | 11/1979 | Reynolds et al. |
| 5,169,023 A | 12/1992 | Heiberg et al. |
| 5,423,452 A | 6/1995 | Tardif |
| 5,644,976 A * | 7/1997 | Muchin et al. ............... 99/422 |
| 6,047,847 A | 4/2000 | Scott |
| 6,431,389 B1 | 8/2002 | Jerstroem et al. |
| 2007/0193575 A1 | 8/2007 | Jan |
| 2013/0133288 A1* | 5/2013 | Kaslik ........................... 53/396 |

FOREIGN PATENT DOCUMENTS

| | | |
|---|---|---|
| DE | 100 18 044 A1 | 10/2001 |
| EP | 0 384 197 A1 | 8/1990 |
| GB | 491517 A | 9/1938 |
| JP | 5192257 A | 8/1993 |
| JP | 2006263293 A | 10/2006 |

OTHER PUBLICATIONS

Bodum catalogue 2008/2009, p. 97.
Bodum catalogue 2011, pp. 90 and 91.
Office Action dated Mar. 20, 2014, issued by the State Intellectual Property Office of the P.R.C. in corresponding Chinese Application No. 2011800556002.

* cited by examiner

BOWL

CROSS REFERENCE TO RELATED APPLICATIONS

This application is a National Stage of International Application No. PCT/CH2011/000045, filed on Mar. 9, 2011, which claims priority from Swiss Patent Application No. 1943/10, filed on Nov. 19, 2010, the contents of all of which are incorporated herein by reference in their entirety.

TECHNICAL FIELD

The present invention relates to a bowl for the mixing of food, for example for the mixing of dough, puddings, etc.

PRIOR ART

Bowls for the mixing of food, in a wide variety of forms, are sufficiently known in the prior art. In the mixing of food, it can be advantageous to the user to hold the bowl in an oblique position or even to tilt it back and forth during the mixing. The circulation and stirring of a food present in the bowl can thereby be aided.

In order to enable such holding in an oblique position or a tilting of the bowl back and forth, it is known from the prior art to configure a bowl with a curved bottom and to provide a stand on which the bowl rests with its curved bottom. Within certain limits, the bowl is here freely pivotable in relation to the stand. Such a bowl with stand is described, for instance, in EP 0 384 197. Devices of this type have the drawback, however, that they consist of at least two separate parts.

It is additionally known to place structures on the outer side of bowls in order to enable an obliquely held bowl to rest on a plane surface. In U.S. Pat. No. 5,169,023, two parallelly running ribs, for example, are attached to the outer side of the bowl in order to allow guided rolling of the bowl on a work surface. U.S. Pat. No. 5,423,452 describes a bowl which in the transition region between the bottom and the side wall is of stepped configuration, so that it is possible to hold the bowl in an oblique position. In these bowls, further tilting out of their oblique position is prevented, however, only in one motional direction. The danger exists that the bowl will nevertheless accidentally slide away or roll during mixing.

The bowls which are shown in GB 491,517 and U.S. Pat. No. 2,121,165 have in the region of their curved outer sides respectively one or more plane bearing surfaces.

The bowl is thereby prevented from accidentally sliding away or rolling when held in oblique orientation to the work surface such that it is supported with one of the plane bearing surfaces.

In U.S. Pat. No. 1,394,540 is described a bowl which in the transition region between a flat bottom and a circumferential side wall has a circumferential thickening in the form of a bead. In an upper region of the side wall, outwardly projecting bosses are also configured. The bowl can be placed in an inclined orientation laterally onto a plane surface, in that it rests on this with respectively two adjacent bosses as well as with the circumferential thickening. Resting of the bowl with the bosses and the thickening on a plane surface is only possible, however, at a predetermined inclination relative to the surface.

REPRESENTATION OF THE INVENTION

One object of the present invention is to define a bowl for the mixing of food, which bowl is configured to rest in an inclined position on a plane surface, wherein the bowl is prevented from accidentally sliding away from this position. This bowl is designed to be able to be produced as easily and as cheaply as possible.

Below, location references such as at the bottom, at the top, above and below relate to a bowl which with an upward-facing removal opening, in relation to the gravitational direction, stands upright on a plane surface. The bowl has an interior which is accessible via the removal opening.

The present invention thus provides a bowl for the mixing of food. The bowl comprises a curved base having a convex outer surface. Preferably, this outer surface is substantially smooth. The term "smooth" should here be understood in the mathematical sense, which means that the outer surface of the base, apart from its marginal region, forms a surface which is continuously differentiable at all points and which, in particular, has no abrupt corners or edges. Preferably, the outer surface is partially spherical or forms a partial ellipsoid.

According to the invention, on the outer surface of the base are configured at least three knobs, which respectively all project outward as far as a common plane, so that the bowl can be placed onto a plane surface, in an orientation inclined with respect to the gravitational direction, such that it rests with all knobs of this group on the plane surface. In other words, the free ends of the knobs of this group lie all in a common plane.

Since the bowl, with the projecting knobs of, respectively, a group, can be placed in an inclined orientation onto a plane surface, the processing of the food received by the bowl is made considerably easier for the user. Hence the user does not necessarily have to introduce a mixer into the bowl from above, for example, but instead he can also thrust it under the content of the bowl from the side. The bowl is here prevented from sliding away or rolling out of this inclined position by the knobs which rest on the surface.

A knob constitutes a pronounced, local elevation of a surface. The knob here clearly stands out from the surface by which it is circumferentially surrounded at the sides. In contrast to a bar, which has substantially larger dimensions in one direction than in a direction perpendicular thereto, a knob has similar dimensions in all directions perpendicular to its longitudinal axis. A knob can have a substantially cylindrical form. However, it can also, for example, be of frustoconical, semispherical or partially semispherical configuration, or can have the form of a straight prism, preferably with a base area in the form of a regular polygon, for example a regular hexagon. The free end of the knob can form a plane surface or can be curved.

The knobs preferably have a diameter which corresponds to no more than the distance between respectively two adjacent knobs, preferably to no more than half the distance, frequently even to just one-tenth to one-fifth of the distance.

The groups of knobs are preferably respectively configured and arranged such that the bowl, when it rests with the knobs of a group on a plane surface, is movable into a different orientation with respect to the gravitational direction only when a certain tilting force is surmounted. It is here preferred that the empty bowl can be placed stably in an inclined position onto a plane surface without it having to be held by the user.

The bowl preferably has a multiplicity of knobs, which form a plurality of groups of respectively at least three knobs, wherein the knobs of each group respectively all project outward as far as a common plane. Sometimes these groups can mutually overlap, i.e. have common knobs, yet they can also be disjunctive, so that each group fully consists of different knobs. Advantageously, the knobs are evenly distributed over a large part of the outer surface of the base, in particular over a region of the base which is circumferential with respect to the direction of opening of the bowl. The bowl hence has a large number of options for resting in an inclined position with a group of knobs on a plane surface. At the same time, it is possible for a central bottom region having no knobs to be provided on the base.

The knobs can respectively have in the outward direction a rounded end. Advantageously, each of the knobs of a common group has an end, however, whose end face forms a plane, outward facing, preferably circular bearing surface. The bearing surfaces of all knobs of a group preferably respectively form a common plane. The knobs of a group can hence rest with their bearing surfaces all respectively flat on a plane surface, whereby the stability of the bowl in the inclined position is enhanced. It is also conceivable, however, that although the end faces of the knobs have plane surfaces, these surfaces do not form a common plane but form a certain angle to one another. In this case it is only important that the knobs of a group project as far as a common plane, so that they can all rest on a plane surface. The knobs can also rest only in a marginal region on the surface. Between the knobs of a group, which, by definition, all project as far as a common plane, can be disposed further knobs, which do not belong to this group and which project less far than the knobs of the group concerned. Although these knobs are unnecessary for the functionality of the present invention, they may be desirable for other reasons, for example to produce a more uniform appearance.

In a preferred embodiment, the knobs of each group respectively all extend parallel to one another outward from the outer surface of the base. The knobs of a group are here generally of different length. When resting on a plane surface, the knobs of a common group hence all extend in perpendicular direction relative to the surface. The result of this is that the forces acting on the knobs are optimally absorbed.

Advantageously, the bowl has a multiplicity of groups, which respectively all have an equal number of knobs. Preferably, the knobs within each group are similarly arranged.

The knobs of, respectively, a group are advantageously arranged such that they jointly form a regular polygon. The knobs can here respectively form the corner points of the polygon. Further knobs can be distributed along the sides and/or over the surface of the polygon. An embodiment in which each group respectively has precisely three knobs is, however, particularly preferred. Advantageously, the knobs are here arranged in the form of an equilateral triangle. In a particularly preferred embodiment, the knobs are arranged such that they form the grid points of a grid of equilateral triangles.

The bowl can be provided, in particular in the region of the base, at least partially with a plastics coating, on which the knobs are integrally configured.

The plastics coating can be sprayed onto the bowl in particular by injection molding or can be otherwise connected to the bowl. Where such a plastics coating of this type is present, it advantageously has a lower Shore A-hardness than the base. The plastics coating can here in particular have a Shore A-hardness of less than 70, though preferably of less than 60, and particularly preferably of around 50. Suitable materials are, for example, silicone rubber or thermoplastic elastomers (TPE) such as Santoprene™ (a TPE on an EPDM/polypropylene base). The knobs can then, when resting on the surface, better adapt thereto, so that, in particular, the forces acting on the knobs are more evenly distributed over the various knobs of a group and the outer side of the base thus becomes more slip-proof. The plastics coating can cover the entire outer surface of the bowl or be provided only in the region of the base. It can also, however, be provided only substantially in the region of the base and extend upward at a certain point, in particular in the region of a handle.

BRIEF DESCRIPTION OF THE DRAWINGS

Preferred embodiments of the invention are described below with reference to the drawings, which serve merely for illustration and should not be interpreted restrictively. In the drawings.

DESCRIPTION OF PREFERRED EMBODIMENTS

Figure 1:
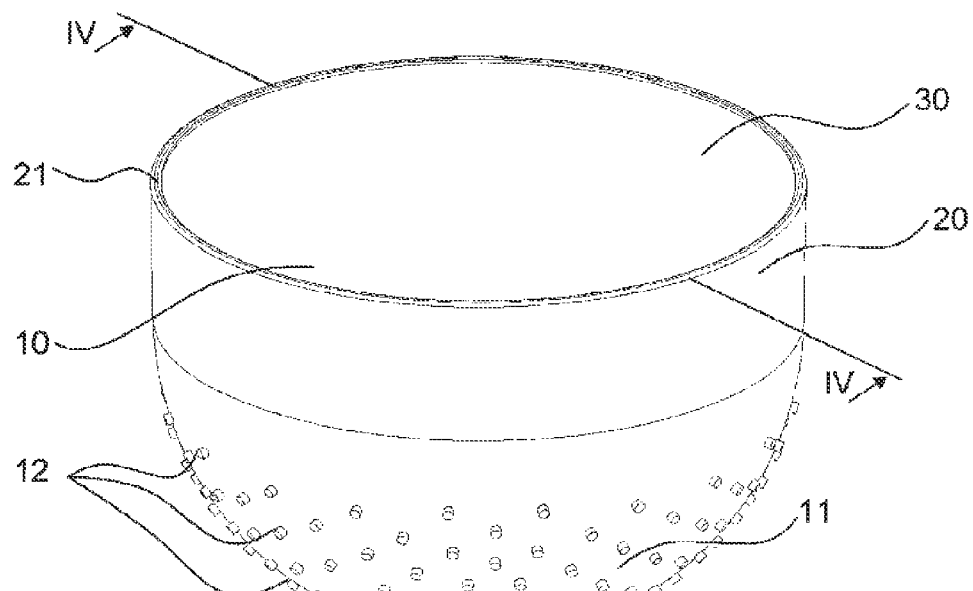
FIG. 1 shows a perspective view of an inventive bowl according to a preferred, first embodiment.
Figure 2:
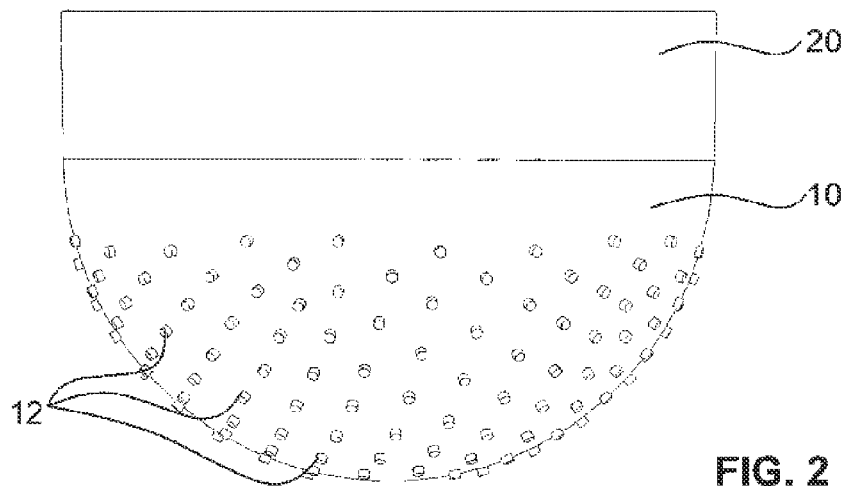
FIG. 2 shows a view of the bowl of FIG. 1 from the side.
Figure 3:
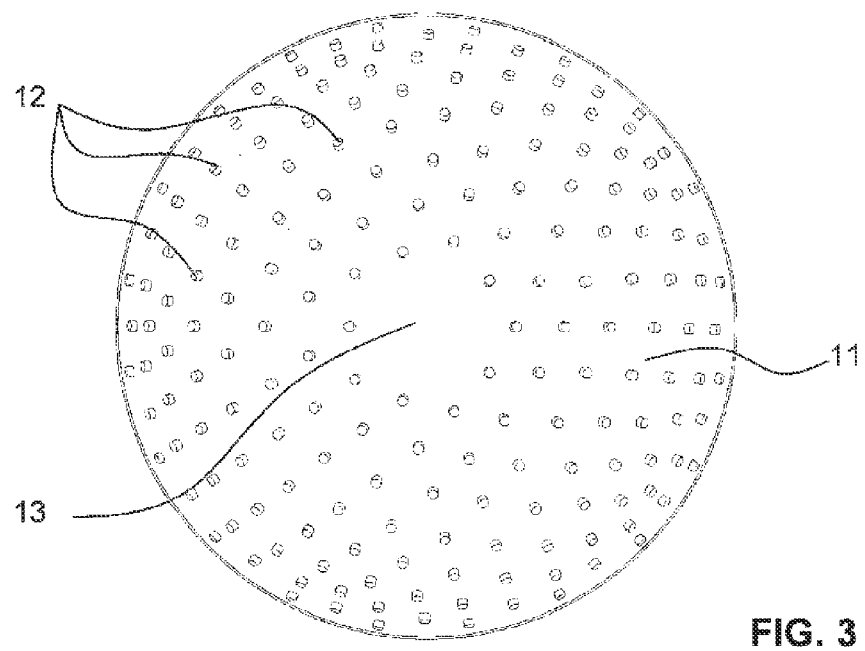
FIG. 3 shows a view of the bowl of FIG. 1 from below.

An inventive bowl for the mixing of food according to a preferred, first embodiment is shown in FIGS. 1 to 6.

The bowl has a base 10 having a curved, convex, smooth outer surface, on which knobs 12 are configured. As in the present illustrative embodiment, the base 10 can be of substantially semispherical configuration. Other forms of the base 10 are also conceivable, however. Thus they could also be designed, for example, only partially semispherical or as an ellipsoid or partial ellipsoid. In its lowermost region, the base 10 has a central bottom region 13 (FIG. 3) without knobs, which here is likewise curved outward. In contrast to the present embodiment, this bottom region 13 could alternatively, however, also be configured flat in order to serve as a standing surface of the bowl when this is placed upright on a surface 70. The base 10 is adjoined in the upward direction by a circumferential, here cylindrical side wall 20.

The base 10 and the side wall 20 jointly delimit with their inner surfaces an interior 30, which serves to receive foods, such as, for example, baking products. The side wall 20 has an upper rim 21, which delimits a removal opening of the bowl. The interior 30 is accessible through this removal opening.

The bowl has a multiplicity of knobs 12, which are configured on the outer surface of the base 10. In the present illustrative embodiment, the knobs 12 of cylindrical design and have a diameter which is smaller by a factor of about three than the distance between respectively two adjacent knobs 12. The length of the knobs 12, which here project radially outward, in each case perpendicular to the outer surface of the base 10, is slightly smaller than their diameter. The knobs 12 respectively have ends which have a plane outer surface. These outer surfaces of the knobs 12 respectively point outward in a perpendicular direction in relation to the outer surface of the base 10.

Figure 5:
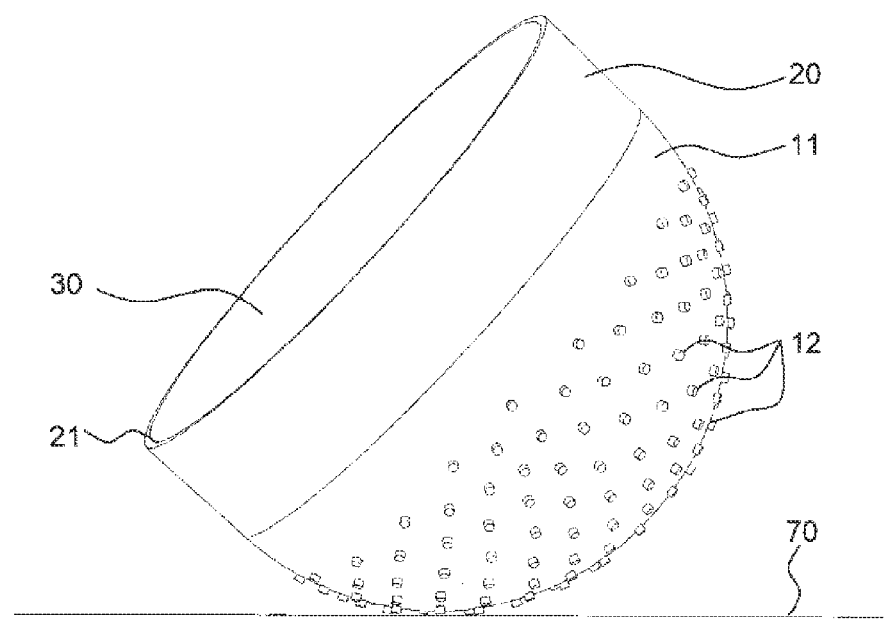
FIG. 5 shows a perspective view of the bowl of FIG. 1, resting on a surface in an oblique position.
Figure 6:
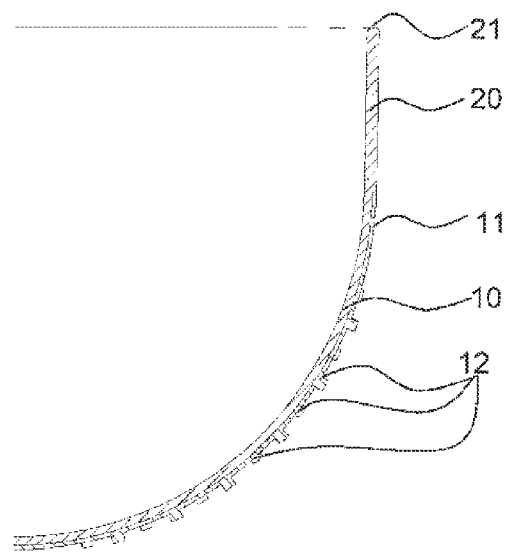
FIG. 6 shows a partial sectional view of the bowl of FIG. 1.

Each knob 12 respectively forms a part of a group. A group of knobs 12 is characterized in that it respectively has at least three knobs 12, wherein all knobs 12 of a group respectively project outward as far as a common plane. As shown in FIG. 5, the bowl can thus be placed in an oblique position onto a plane surface 70 such that it rests on this with all the knobs 12 of a group. The knobs do not necessarily have to rest with the whole of their end face on the plane surface, but rather it is sufficient if the knobs, as in the present example, rest only with a marginal region of their free end on the plane surface. The bowl can, but does not have to, additionally rest on the surface 70 with a point located between the knobs 12. The knobs 12 resting on the plane surface 70 prevent the bowl from accidentally sliding or tilting away when it rests in this position on a surface 70.

In the present case, precisely three knobs 12 respectively form a common group. The knobs 12 of a group are here respectively arranged such that they form the corner points of an equilateral triangle. Other arrangements of the knobs 12 of a common group are also conceivable, however. Thus the knobs 12 of a group could be arranged in the form of a polygon of choice, in particular a regular polygon. The knobs 12 do not here necessarily have to be positioned only at the corner points of the triangle or polygon, but could also, for example, be arranged along the sides or regularly distributed over the surfaces of the triangle or polygon. The bowl can also, of course, have any chosen combination of differently configured groups of knobs.

In the present case, the knobs 12 are distributed circumferentially and regularly over almost the entire outer surface of the base 10. The knobs 12 here form a multiplicity of groups of respectively three knobs 12, which are arranged in the form of an equilateral triangle. Only in the uppermost region of the base 10 and in the central bottom region 13 are there no knobs present. The knobs 12 arranged around the bottom region 13, which in the present case jointly form a pentagon, can serve, in particular, to hold the bowl stable in its position when it is resting in an upright position on a plane surface 70. Between the central bottom region 13 and the uppermost region of the base 10, the knobs 12 are preferably distributed, as here, regularly over the entire outer surface of the base 10. In the present embodiment, not only are the knobs 12 arranged in groups in the form of equilateral triangles, but they also, moreover, form the grid points of a grid of equilateral triangles. Due to this regular arrangement of the knobs 12, an individual knob 12 can respectively form a part of several, here from four to six groups. The various groups of knobs can thus, as is here the case, also overlap.

Figure 4:
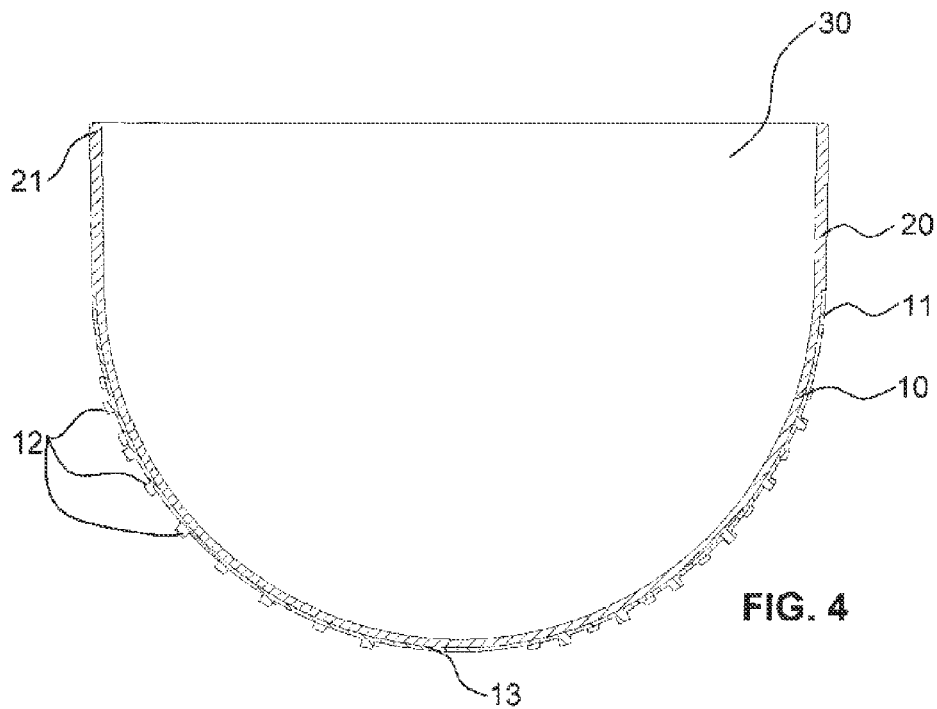
FIG. 4 shows a central sectional view of the plane IV-IV through the bowl of FIG. 1.

The knobs 12 can jointly be configured integrally with the base 10. Preferably, however, the knobs 12, as can be seen for example in FIG. 4, are configured integrally on a plastics coating 11. This plastics coating 11 can cover a part or even the whole of the outer surface of the base 10. Advantageously, the plastics coating 11 is here applied to the base 10 in such a way that its outer side, as is shown in FIG. 4, is arranged flush with the rest of the outer side of the bowl. In the present illustrative embodiment, the outer side of the plastics coating 11 is arranged flush with the outer side of the side wall 20. The plastics coating 11 can here, in particular, be sprayed onto the base 10, which is made, preferably integrally with the side wall 20, of a plastic. Advantageously, the plastics coating 11 is made, in comparison to the base 10, of a softer material, i.e. of a material having a lower Shore A-value, for example of silicone rubber. Due to this softness of the plastics coating 11, the knobs 12, when resting on a surface, can better adapt thereto, so that the forces are better distributed amongst the various knobs 12 of the corresponding group. Moreover, the outer side of the base becomes in this way more slip-proof.

Figure 7:
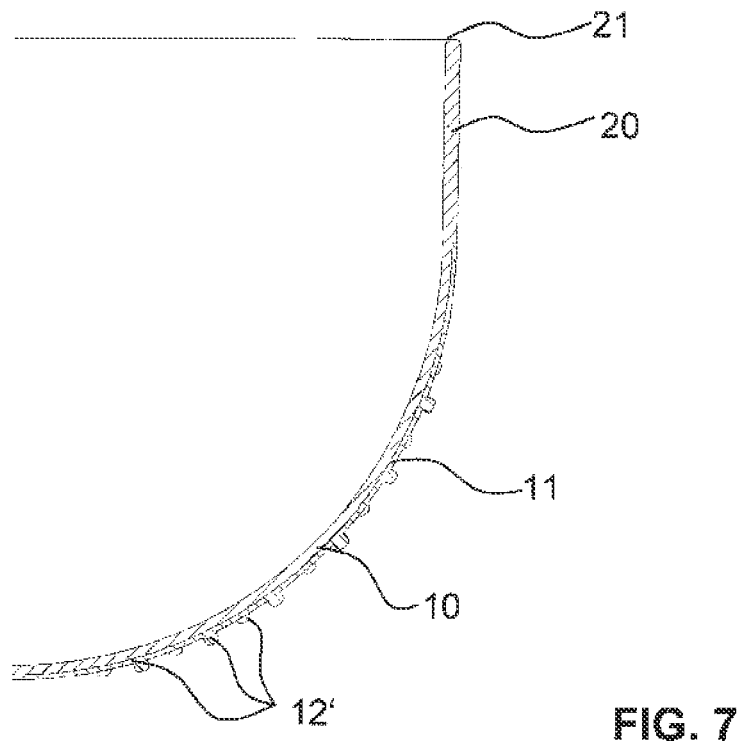
FIG. 7 shows a partial sectional view of an inventive bowl according to a second embodiment.

According to the embodiment represented in FIG. 7, the knobs 12' do not necessarily have to have plane end faces, but can also be of rounded configuration on their outward facing free ends.

Figure 8:
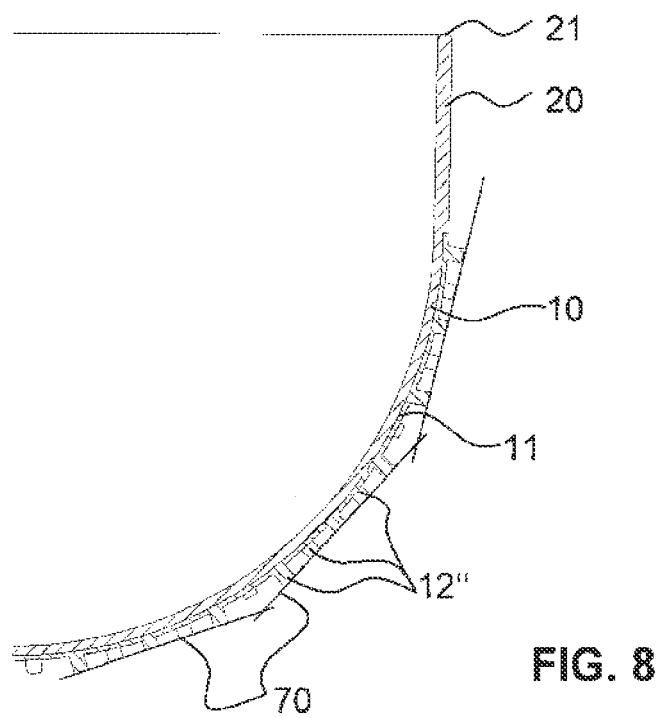
FIG. 8 shows a partial sectional view of an inventive bowl according to a third embodiment.

A particularly advantageous embodiment is shown in FIG. 8. The knobs 12" of a common group here respectively all extend outward parallel to one another. A group here respectively has five knobs 12", wherein more or less than five, yet at least three, knobs 12" per group could naturally also be provided. In the present illustrative embodiment, the knobs 12" of a common group are respectively configured with different length such that they end with their here preferably plane outer surfaces on a common plane. Due to this particular design of the knobs 12" within a group, the bowl can rest in an oblique position with all knobs 12" of respectively a group on a plane surface 70 such that all knobs 12" stand perpendicularly on the surface 70 and the outer surfaces of the knobs 12" rest flat on the surface 70.

Figure 9:
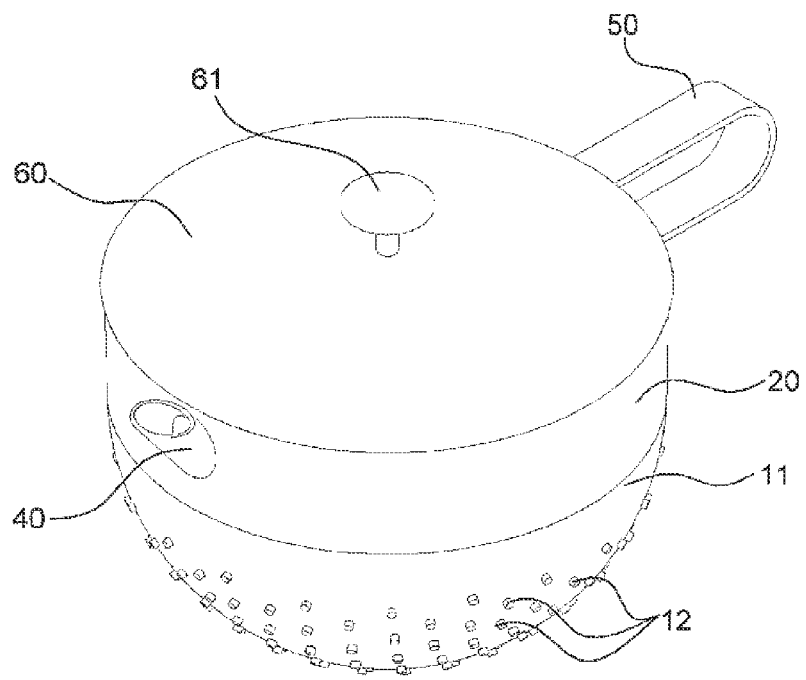
FIG. 9 shows a perspective view of an inventive bowl according to a fourth embodiment.

A further embodiment of an inventive bowl is represented in FIG. 9. The bowl here additionally has in the region of its side wall 20 a spout 40 for pouring out of the bowl content. The spout 40 can be disposed, as here, within the side wall. It is also conceivable, however, to arrange the spout in the region of the upper rim 21 of the side wall 20. Moreover, in the present illustrative embodiment, the interior 30 of the bowl is closed off to the top by a lid 60. The lid 60 has a handle 61. In order that the lid 60, in an inclined position of the bowl, does not slip away from this, it can have, in particular, a downwardly extending casing, which, adjacent to the side wall 20, juts into the interior 30. Furthermore, in this illustrative embodiment, a handle 50 is attached to the bowl, which handle makes the bowl easier to handle for the user. Of course, it is also possible, however, to dispense with the spout, the handle and the lid. Even the side wall 20 can be fully dispensed with in order to obtain a flat bowl.

Figure 10:
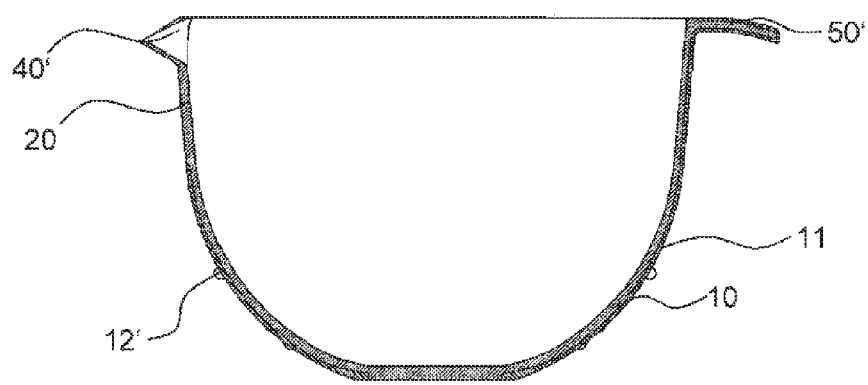
FIG. 10 shows a central sectional view through an inventive bowl according to a fifth embodiment.
Figure 11:
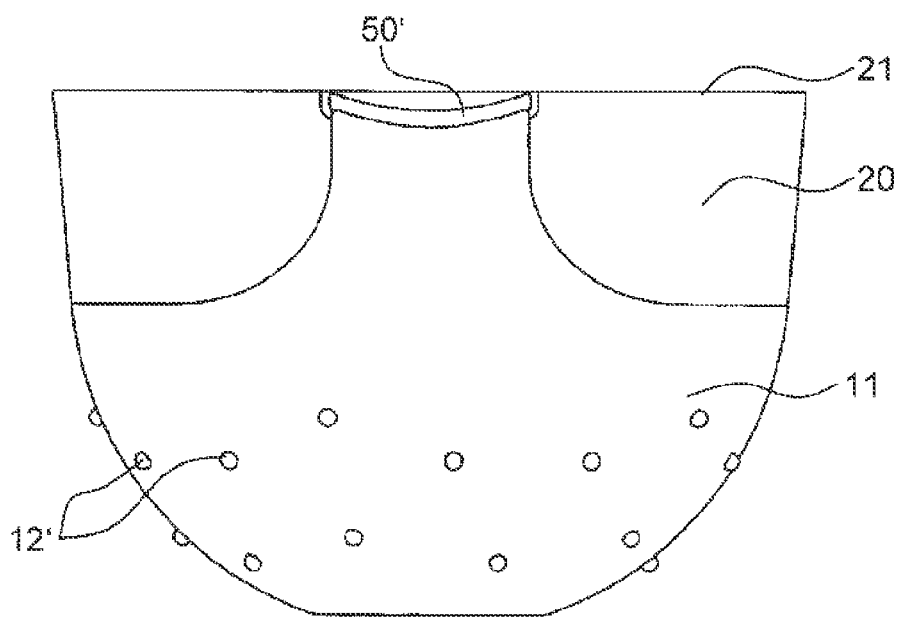
FIG. 11 shows a view of the bowl of FIG. 10 from the side.

Yet another embodiment of an inventive bowl is shown in FIGS. 10 and 11. The bowl here has a spout 40' on the upper rim 21 of the side wall 20, and a diametrically opposing handle 50'. As can be seen, in particular, in FIG. 11, the plastics coating 11 here extends upward in the region of the handle 50' and both over the bottom side and over the top side of the handle 50'. It can here cover the handle fully or else only partially. In a central region, the base 10 is of flattened design. Moreover, the plastics coating 11, as here, can have in this flattened region a circular opening, into which the base 10 can extend with a downwardly jutting region. In the region around this central opening, the plastics coating 11 is configured slightly thickened in order to form a bearing region for improved stability of the bowl in its upright position. The knobs 12' are here attached to the plastics coating 11 only in the region where the base 10 is curved, and not in the region where it is flattened.

REFERENCE SYMBOL LIST 10 base
11 plastics coating
12, 12', 12" knobs
13 central bottom region
20 side wall
21 upper rim
30 interior
40, 40' spout
50, 50' handle
60 lid
61 handle
70 surface

The invention claimed is:

1. A bowl for the mixing of food, comprising:
   a curved base comprising a convex and substantially smooth outer surface that forms a part of a sphere or of an ellipsoid,
   wherein on the outer surface are configured a plurality of groups of at least three knobs in each group, with each knob having a bearing surface,
   wherein the knobs respectively have a diameter which amounts to no more than half the distance between respectively two adjacent knobs, and
   wherein the bearing surfaces of all knobs of each three knob group form a common plane, so that the bowl has a plurality of options of placement onto a plane surface, in an oblique position and in an orientation inclined with respect to gravitational direction, such that the bowl rests with all knobs of one three knob group on the plane surface, in order for the user to be able to hold the bowl in said oblique position during the stirring of food present in the bowl.

2. The bowl as claimed in claim 1, wherein at least one group of knobs is configured and arranged such that the bowl, when the bowl rests with the knobs of one group on a plane surface, is movable into a different orientation with respect to the gravitational direction only when a tilting force is surmounted.

3. The bowl as claimed in claim 1, wherein at least one group of knobs is configured and arranged such that the empty bowl, when it rests with the knobs of one group on a plane surface, stands stably on the surface.

4. The bowl as claimed in claim 1,
   wherein each of the knobs of a common group has an end which forms a plane, outward facing bearing surface, and
   wherein the bearing surfaces of all knobs of a group run in a common plane.

5. The bowl as claimed in claim 1, wherein the knobs of each group respectively all extend parallel to one another outward from the outer surface of the base.

6. The bowl as claimed in claim 1, wherein the knobs are arranged such that they form the grid points of a grid of equilateral triangles.

7. The bowl as claimed in claim 1, wherein the knobs of each group are arranged such that they jointly form a regular polygon.

8. The bowl as claimed in claim 1, wherein the knobs are evenly distributed, at least over a circumferential region of the outer surface of the base.

9. The bowl as claimed in claim 1, wherein the knobs respectively have a cylindrical form.

10. The bowl as claimed in claim 1, wherein the bowl is provided, at least in the region of the base, with a plastics coating, on which the knobs are integrally configured.

11. The bowl as claimed in claim 10, wherein the plastics coating has a lower Shore A-hardness than the main body.

* * * * *